US012268640B2

(12) United States Patent
Reynolds et al.

(10) Patent No.: US 12,268,640 B2
(45) **Date of Patent: *Apr. 8, 2025**

(54) CASKET ORNAMENT ATTACHMENT MECHANISM

(71) Applicant: Batesville Services, Inc., Batesville, IN (US)

(72) Inventors: Kristine Ann Reynolds, Oldenburg, IN (US); Todd Jefferey Tekulve, Batesville, IN (US); Gregory Wray, Guilford, IN (US)

(73) Assignee: Batesville Services, Inc., Batesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,405

(22) Filed: Mar. 12, 2024

(65) Prior Publication Data

US 2024/0216206 A1 Jul. 4, 2024

Related U.S. Application Data

(60) Continuation of application No. 18/157,876, filed on Jan. 23, 2023, now Pat. No. 11,951,049, which is a division of application No. 17/349,511, filed on Jun. 16, 2021, now abandoned, which is a division of application No. 16/598,186, filed on Oct. 10, 2019, now Pat. No. 11,135,116.

(60) Provisional application No. 62/745,053, filed on Oct. 12, 2018.

(51) Int. Cl.
*A61G 17/04* (2006.01)
*A61G 17/08* (2006.01)

(52) U.S. Cl.
CPC ......... *A61G 17/0407* (2017.05); *A61G 17/08* (2013.01)

(58) Field of Classification Search
CPC .... A61G 17/0407; A61G 17/08; A61G 17/04; E04H 13/008
See application file for complete search history.

(56) References Cited

U.S. PATENT DOCUMENTS

| | | | |
|---|---|---|---|
| 5,896,632 | A | 4/1999 | Sturino |
| 6,295,705 | B1 | 10/2001 | Gersten |
| 6,557,222 | B2 | 5/2003 | Groemminger et al. |
| 6,591,466 | B1 | 7/2003 | Acton et al. |
| 6,691,385 | B2 | 2/2004 | Bell et al. |
| 6,928,706 | B2 | 8/2005 | Acton et al. |
| 7,200,905 | B2 | 4/2007 | Cunningham et al. |
| 7,260,872 | B2 | 8/2007 | Schultz |

(Continued)

OTHER PUBLICATIONS

LIFESYMBOLS® Brochure, 2014, downloaded from https://www.batesville.com/wp-content/uploads/2018/12/LifeSymbols-LifeStories-Interchangability-How-To.pdf.

*Primary Examiner* — William L Miller
(74) *Attorney, Agent, or Firm* — Dinsmore & Shohl LLP

(57) ABSTRACT

A combination cremation urn and ornament comprises a base adapted to receive cremation ashes therein, an upstanding post mounted to an upper surface of said base and extending upwardly therefrom, and a decorative ornament that is three-dimensional an entire 360 degrees about a vertical axis of said decorative ornament, said decorative ornament having a hole extending upwardly from a bottom thereof into said decorative ornament, said post received in said hole as said decorative ornament is positioned on said base to secure said decorative ornament to said base.

9 Claims, 10 Drawing Sheets

(56) References Cited

U.S. PATENT DOCUMENTS

| | | | |
|---|---|---|---|
| 7,340,810 | B2 | 3/2008 | Acton et al. |
| 7,343,653 | B2 | 3/2008 | Cunningham et al. |
| 7,591,052 | B2 | 9/2009 | Bovard et al. |
| 7,698,792 | B1 | 4/2010 | Parker |
| 8,196,275 | B2 | 6/2012 | Wessel |
| 9,334,669 | B1 * | 5/2016 | Byndon ................ E04H 13/008 |
| 10,350,126 | B1 | 7/2019 | Wessel et al. |
| 10,828,219 | B2 | 11/2020 | Podolske |
| 2002/0148084 | A1 | 10/2002 | Bell et al. |
| 2004/0040128 | A1 | 3/2004 | Ogle, II |
| 2008/0251480 | A1 * | 10/2008 | Roberts .............. A61G 17/0136 211/85.27 |
| 2009/0064546 | A1 | 3/2009 | Larbrisseau |
| 2010/0077577 | A1 | 4/2010 | Rojdev |
| 2010/0077578 | A1 | 4/2010 | Motz et al. |
| 2010/0077579 | A1 | 4/2010 | Parker |
| 2010/0077580 | A1 | 4/2010 | Holzman |
| 2010/0199476 | A1 * | 8/2010 | Cummings ........ A61G 17/0166 27/1 |
| 2010/0287749 | A1 | 11/2010 | Rojdev |
| 2011/0078882 | A1 | 4/2011 | Wessel |
| 2012/0266423 | A1 | 10/2012 | Rojdev |
| 2013/0086779 | A1 | 4/2013 | Florea |
| 2014/0041170 | A1 | 2/2014 | Bovard et al. |
| 2014/0182096 | A1 * | 7/2014 | Jairala, Jr. ............ A47G 1/0616 27/1 |
| 2015/0026938 | A1 | 1/2015 | Rojdev |
| 2020/0276070 | A1 | 9/2020 | Reynolds et al. |

* cited by examiner

CASKET ORNAMENT ATTACHMENT MECHANISM

CROSS-REFERENCE TO RELATED APPLICATIONS

This application is a continuation of U.S. patent application Ser. No. 18/157,876, filed Jan. 23, 2023, which is a divisional of U.S. patent application Ser. No. 17/349,511 filed Jun. 16, 2021, which is a divisional of U.S. patent application Ser. No. 16/598,186 filed Oct. 10, 2019, which claims the priority benefit of U.S. Provisional Patent Application No. 62/745,053 filed Oct. 12, 2018, which are hereby incorporated by reference herein as if fully set forth in their entirety.

FIELD OF THE INVENTION

This invention relates generally to caskets, and more particularly to mechanisms for attaching ornaments to caskets.

BACKGROUND OF THE INVENTION

It is known to attach decorative ornaments to caskets to "personalize" the casket to the deceased. Over the years various mechanisms have been devised by the assignee to attach decorative ornaments to funerary articles, and more particularly, to attach decorative corner ornaments to casket corners.

Examples of mechanisms for attaching decorative "figurine" style ornaments to the exterior of a casket, for example to the corners of the casket shell, are shown in, for example, the assignee's U.S. Pat. Nos. 6,591,466, 6,928,706, 7,340,810 and 7,591,052, and US Patent Application Publication No. 2010/0077579, all hereby incorporated by reference herein as if fully set forth in their entireties. The casket corner ornaments of the '466, 706, and '810 patents, and the '579 publication, utilize fasteners with heads, for example shoulder screws, mounted on the flat or planar rear side of the ornament, the heads of which are secured in keyhole slots or grooves, for example L-shaped keyhole slots or grooves, in the casket shell corners. These ornaments are commercially available from the assignee as its LIFESYMBOLS® line of casket shell corner ornaments.

Nevertheless, there remains room for improvement in such casket ornaments and casket ornament attachment mechanisms.

SUMMARY OF THE INVENTION

In one aspect, a combination casket and ornament comprises a casket shell having a pair of keyhole-shaped grooves in a corner thereof, an L-shaped adapter having a leg and a foot, the leg having a pair of studs on a rear side thereof each of which is received in a respective one of the keyhole-shaped grooves, and a decorative ornament that is three-dimensional an entire 360 degrees about a vertical axis of the ornament, the ornament positioned on the foot of the L-shaped adapter.

Each keyhole-shaped groove can be L-shaped. The foot of the adapter can include an upstanding post thereon and the ornament can have a hole extending upwardly from a bottom thereof into the ornament; the post can thus be received in the hole as the ornament is positioned on the foot of the adapter to secure the ornament to the adapter. The keyhole-shaped grooves can be formed in a clip that is attached to the casket shell corner.

In another aspect, a combination cremation urn and ornament comprises a cremation ashes receptacle having a pair of keyhole-shaped grooves in a surface thereof, an L-shaped adapter having a leg and a foot, the leg having a pair of studs on a rear side thereof each of which is received in a respective one of the keyhole-shaped grooves, and a decorative ornament that is three-dimensional an entire 360 degrees about a vertical axis of the ornament, the ornament positioned on the foot of the L-shaped adapter.

In yet another aspect, a combination cremation urn and ornament comprises a base adapted to receive a small amount of cremation ashes therein, an upstanding post mounted to an upper surface of the base and extending upwardly therefrom, and a decorative ornament that is three-dimensional an entire 360 degrees about a vertical axis of the ornament, the ornament having a hole extending upwardly from a bottom thereof into the ornament, the post received in the hole as the ornament is positioned on the base to secure the ornament to the base.

In yet another aspect, a memorial plaque comprises a plaque surface having a pair of keyhole-shaped grooves therein, an L-shaped adapter having a leg and a foot, the leg having a pair of studs on a rear side thereof each of which is received in a respective one of the keyhole-shaped grooves, the foot having an upstanding post thereon, and a decorative ornament that is three-dimensional an entire 360 degrees about a vertical axis of the ornament, the ornament having a hole extending upwardly from a bottom thereof into the ornament, the post received in the hole as the ornament is positioned on the foot of the adapter to secure the ornament to the adapter.

In yet another aspect, a combination funerary ornament and mount comprises an L-shaped adapter having a leg and a foot, the leg having a pair of studs on a rear side thereof each of which is adapted to be received in a respective keyhole-shaped groove of a casket shell, a cremation urn, or a memorial plaque, the foot having an upstanding post thereon, and a decorative ornament that is three-dimensional an entire 360 degrees about a vertical axis of the ornament, the ornament positioned on the foot of the L-shaped adapter, the ornament having a hole extending upwardly from a bottom thereof into the ornament, the post received in the hole as the ornament is positioned on the foot of the adapter to secure the ornament to the adapter.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
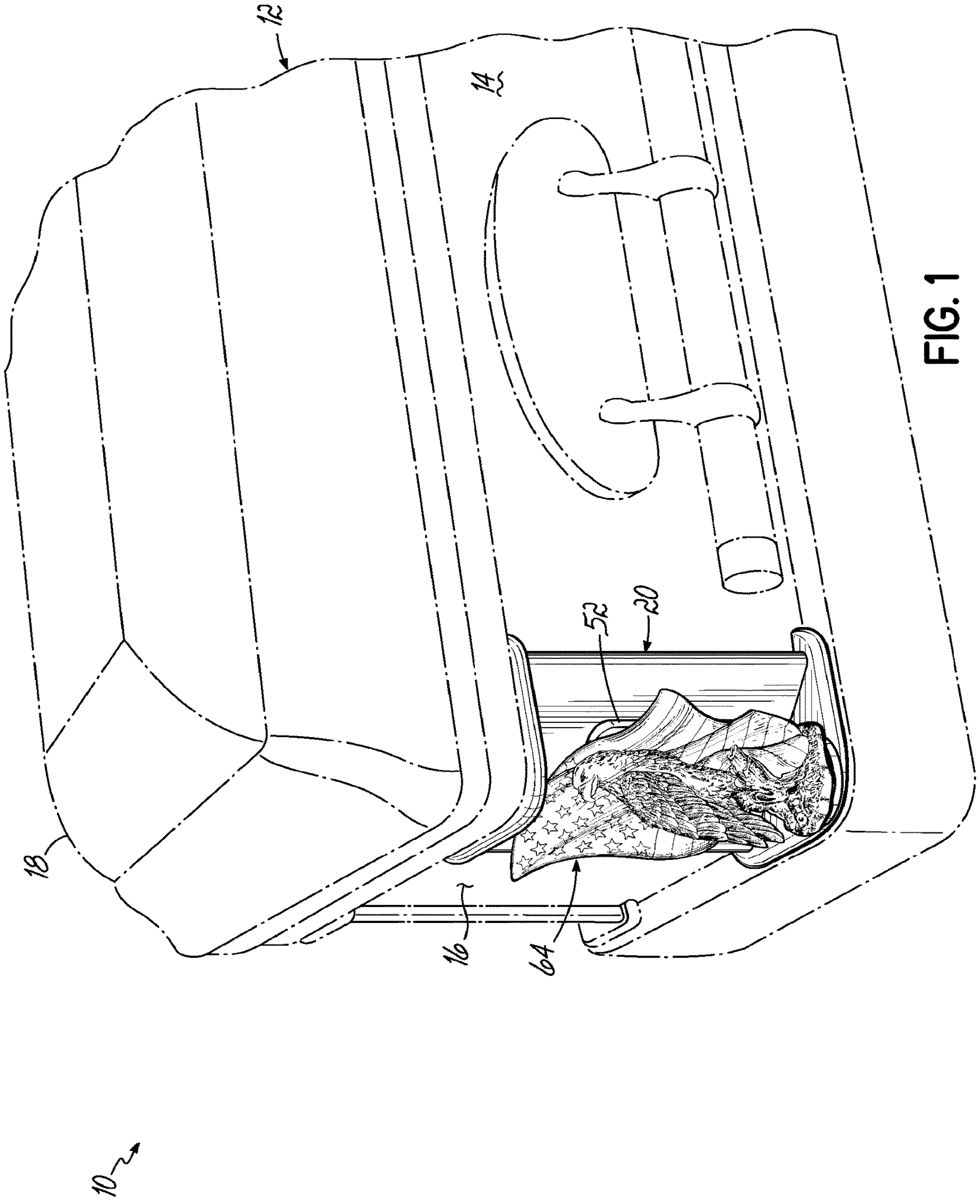
FIG. 1 is a perspective view of one corner of a casket with a casket corner ornament of the present invention that is three-dimensional the entire 360 degrees about a vertical axis of the ornament and that is mounted to the casket corner adapter of the present invention.
Figure 2A:
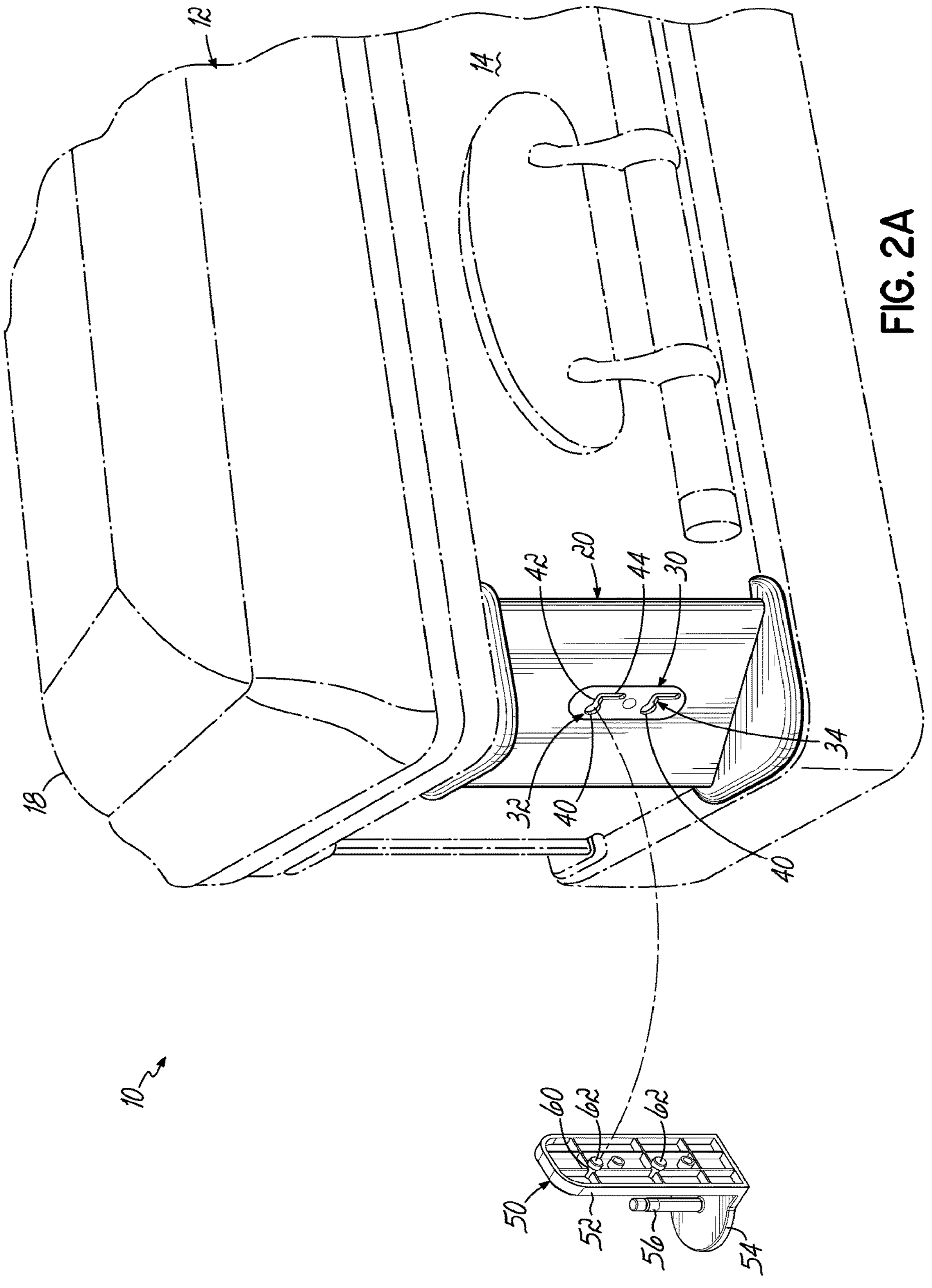
FIG. 2A is a view similar to FIG. 1 illustrating the step of mounting the adapter to the casket corner.
Figure 2B:
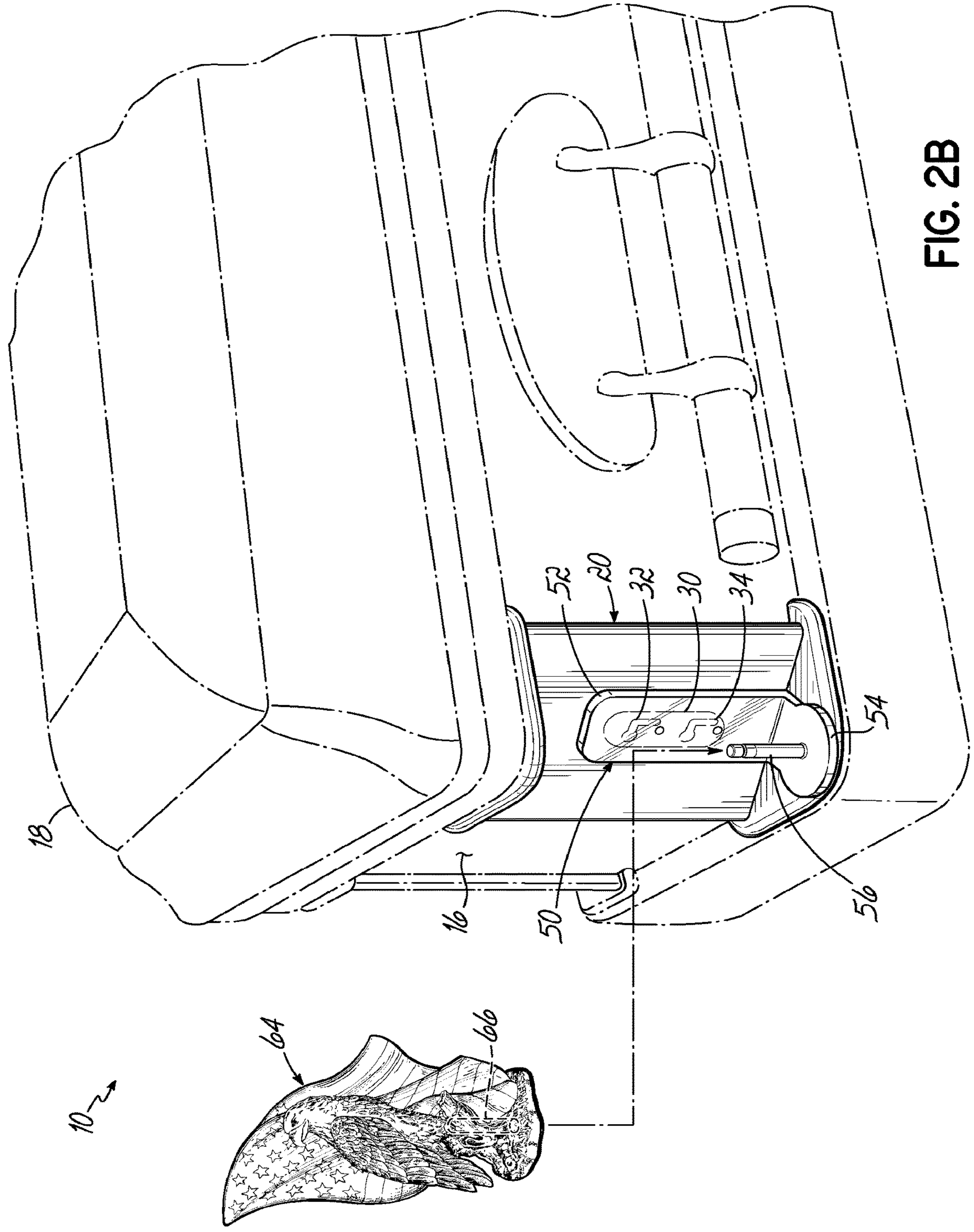
FIG. 2B is a view similar to FIG. 2A illustrating the step of mounting the ornament to the adapter.

Referring first to FIGS. 1, 2A, and 2B, there is illustrated a casket 10 having a casket shell 12 with a pair of side walls 14 and a pair of end walls 16. The casket 10 has at least one lid 18 thereon. The casket shell 12 has a 45-degree corner 20 at adjacent ends of the side walls 14 and end walls 16. A clip 30 is recessed into the corner 20. The clip 30 has a pair of right-angle or L-shaped keyhole-shaped grooves 32, 34 formed therein. Each keyhole groove 32, 34 has a generally circular opening 40, a first generally horizontal linear groove 42 communicating with the opening 42 and a second generally vertical groove 44 communicating with the first groove 42. The clip 30 can be molded of plastic. Note that the clip 30 can be used with metal caskets and with wood caskets. For that matter, the casket need not even use such a clip 30, as long as the 45-degree corner portions of the casket shell (metal or wood) have the pair of right-angle keyhole-shaped grooves formed therein.

An adaptor 50 is generally L-shaped and has a generally vertical leg 52 and a generally horizontal foot 54 connected to a lower end of the leg 52. The foot 54 has an upstanding post 56 extending upwardly from the foot 54. The leg 52 has a pair of studs 60 on a rear side thereof. Each stud 60 has a head 62 thereon. Each head 62 is received in a respective one of said keyhole-shaped grooves 32, 34. More particularly, each head 62 is inserted into a respective opening 42. Thereafter, the adapter 50 is moved horizontally to the right such that each head 62 is retained behind its respective horizontal groove 42. When the adapter 50 cannot be moved any further to the right, the adapter 50 is then moved vertically downwardly until the studs 60 bottom out in their respective vertical grooves 44. The adapter 50 can be molded of plastic, and preferably clear plastic, so as to be as inconspicuous as possible.

A decorative ornament 64 is three-dimensional an entire 360 degrees about a vertical axis of the ornament. In other words, the ornament 64 does not have a planar back like the prior art type of decorative ornaments. The ornament has a cylindrical hole 66 (FIG. 3B) that extends upwardly from the bottom of the ornament 64 up into the body of the ornament 64. The ornament 64 can thus be placed on the foot 54 of the adapter 50, the post 56 residing in the cylindrical hole 66. Alternatively, or additionally, a plastic sleeve (not shown) can be pressed into the cylindrical hole 66 to provide a more snug connection between the post 56 and ornament 64.

Figure 3A:
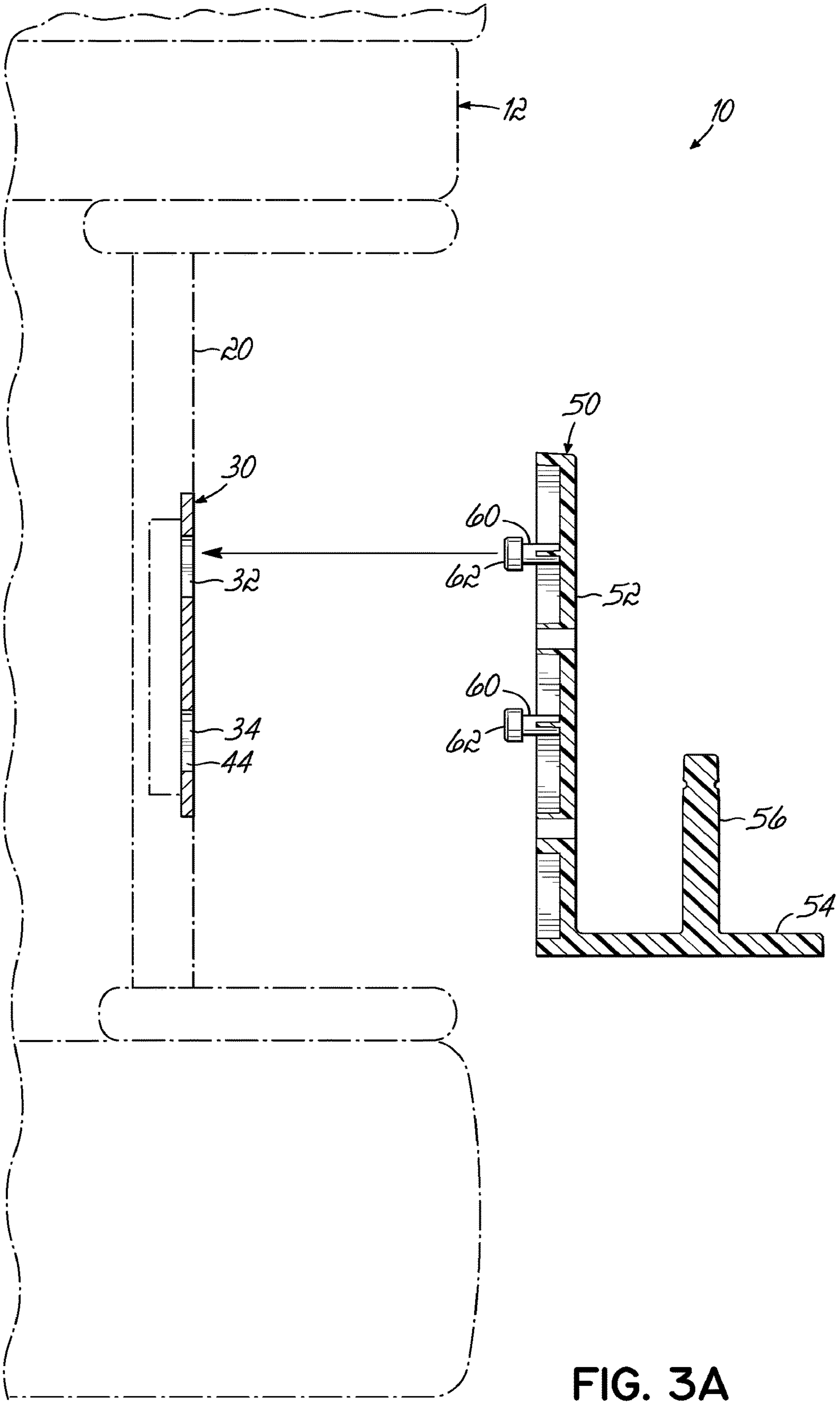
FIG. 3A is a side view of the casket corner, in partial cross-section, illustrating the step of mounting the adapter to the casket corner.
Figure 3B:
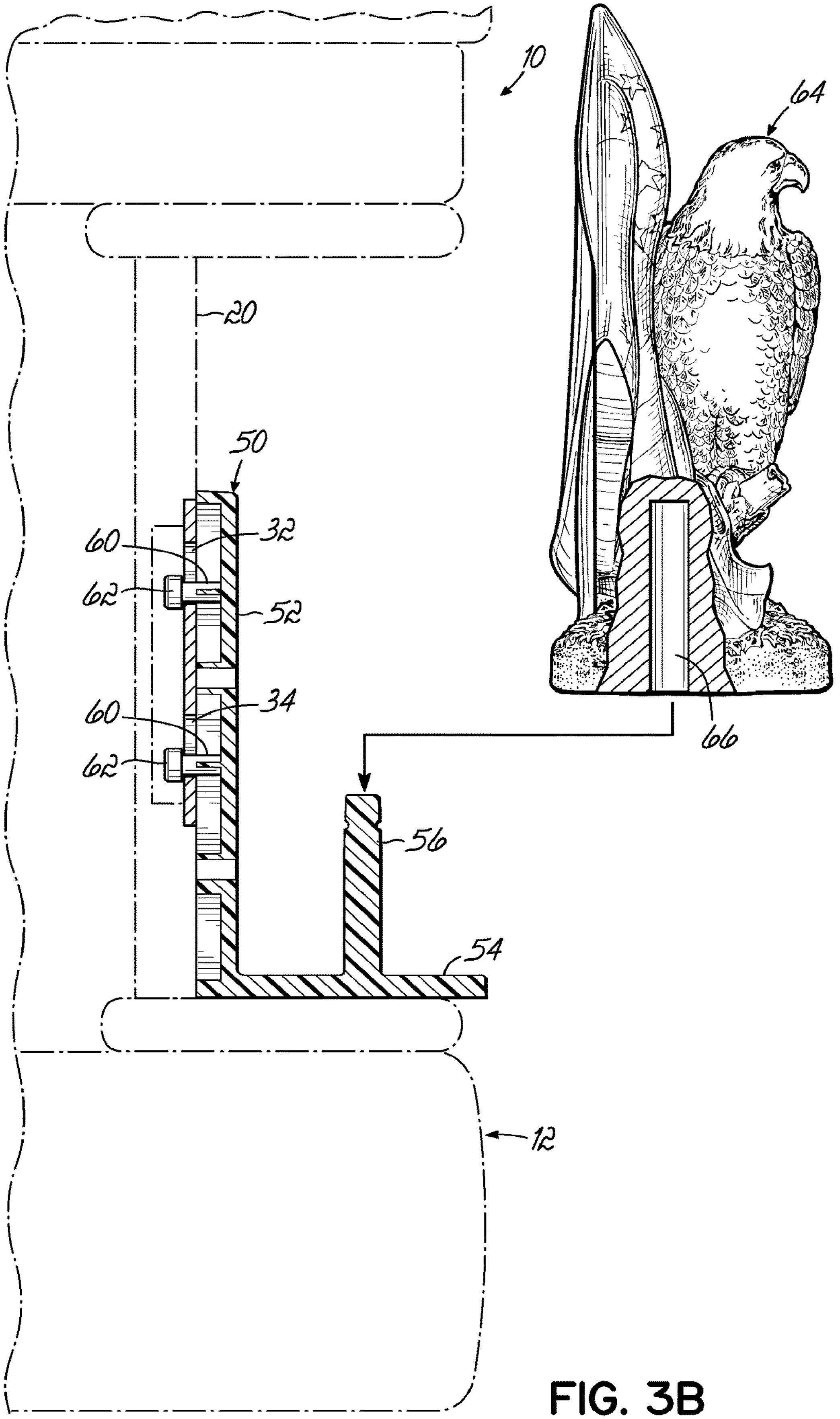
FIG. 3B is a view similar to FIG. 3A illustrating the step of mounting the ornament to the adapter.
Figure 3C:
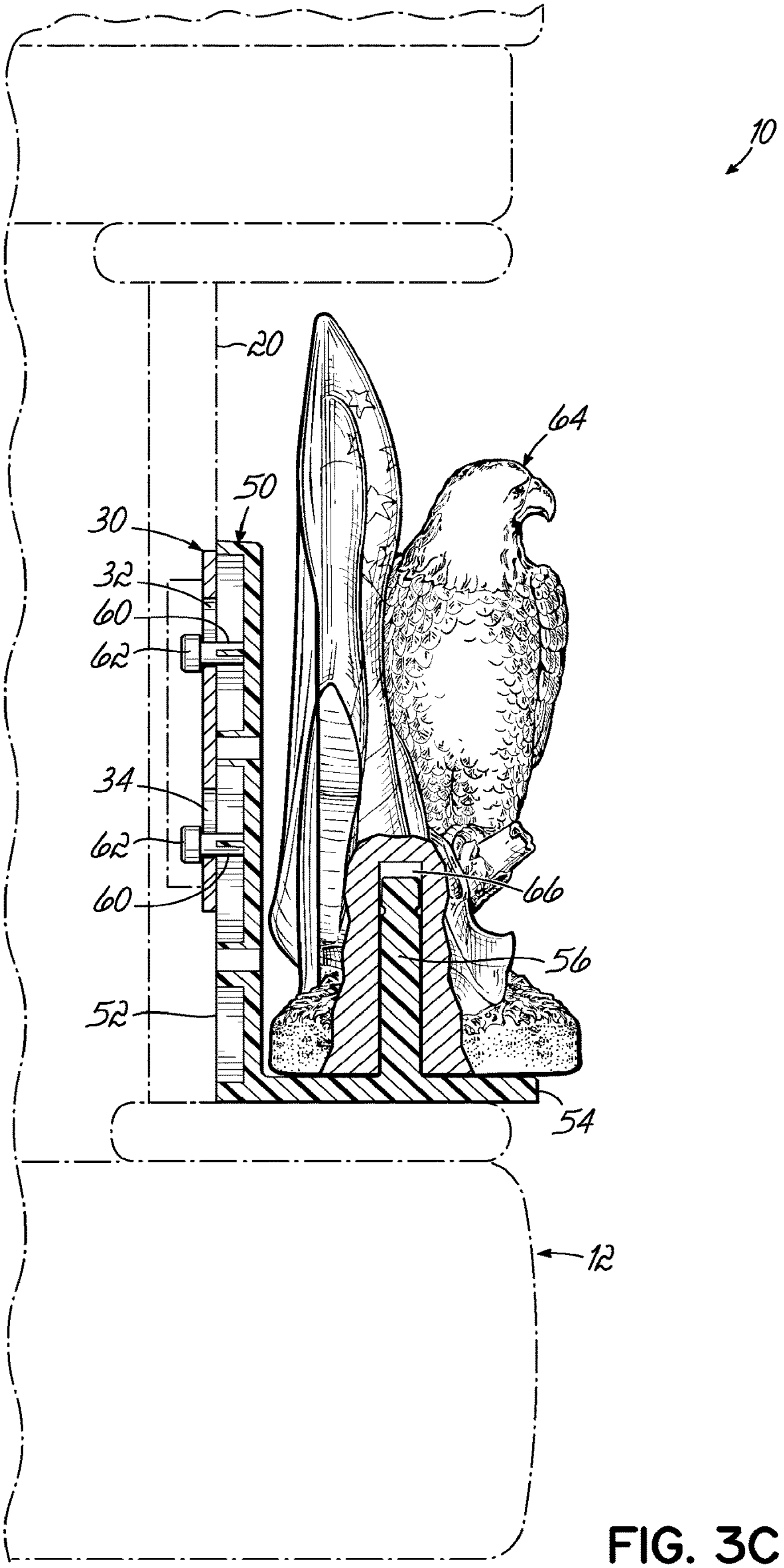
FIG. 3C is a view similar to FIG. 3B illustrating the adapter mounted to the casket corner and the ornament mounted to the adapter.

FIGS. 3A-3C illustrate the steps in attaching the adapter 50 to the clip 30, and the ornament 64 to the adapter 50. Due to the height of the ornament 64, it will likely need to be installed on the adapter 50 first, and the adapter 50, with ornament 64 installed thereon, can be installed on the clip 30. For shorter ornaments, the adapter 50 can be installed to the clip 30 first, and then the ornament 64 can be installed to the adapter 50.

Figure 4:
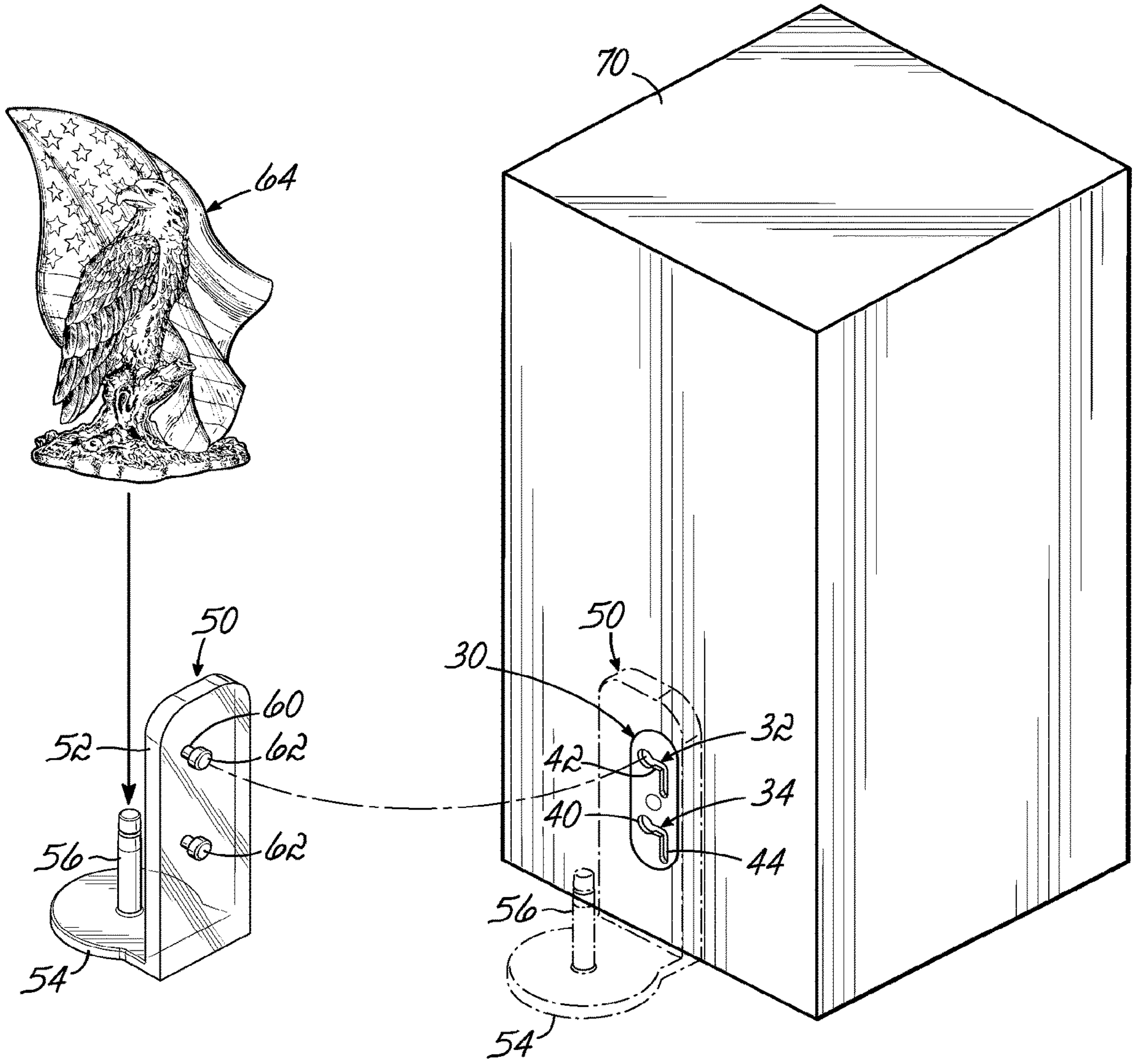
FIG. 4 is a perspective view illustrating the adapter mounted to a cremation urn and the ornament mounted to the adapter.

FIG. 4 illustrates an alternative embodiment wherein a cremation urn 70 has a clip 30 attached thereto. The adapter 50 can then be installed on the urn 70, and the ornament 64 can then be installed on the adapter 50. As in the prior embodiment, the urn need not even use such a clip 30, as long as a surface of the urn (metal or wood) has the pair of right-angle keyhole-shaped grooves formed therein.

Figure 5A:
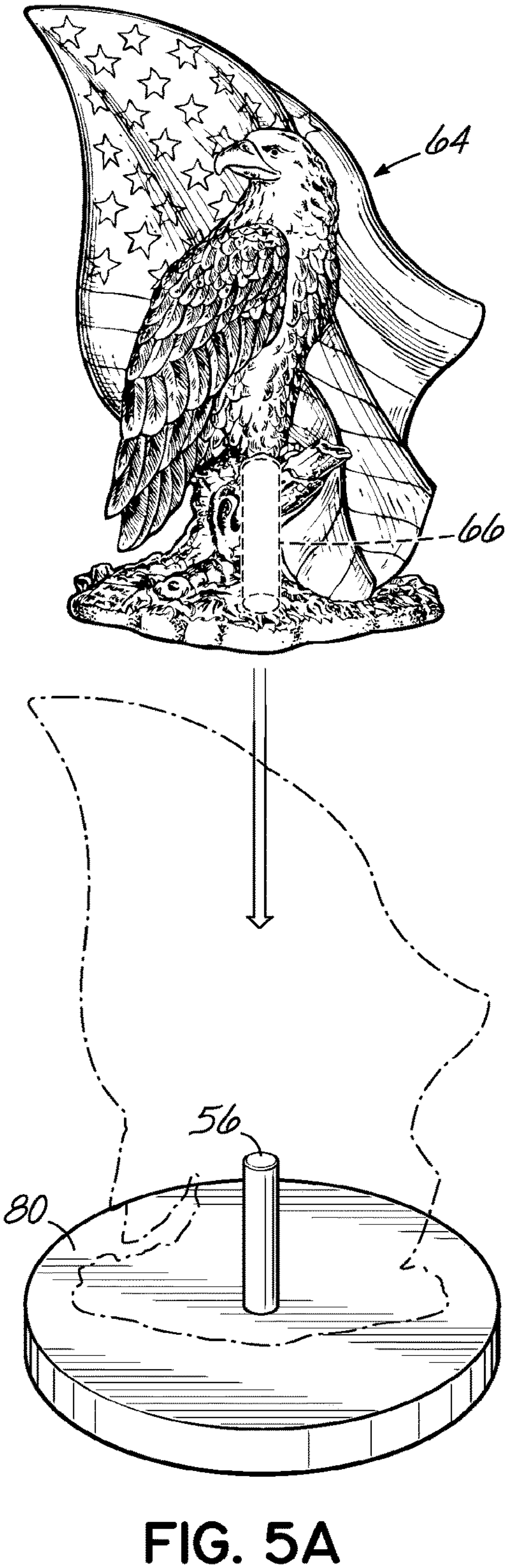
FIGS. 5A and 5B are front perspective views illustrating the ornament mounted to a base.
Figure 5B:
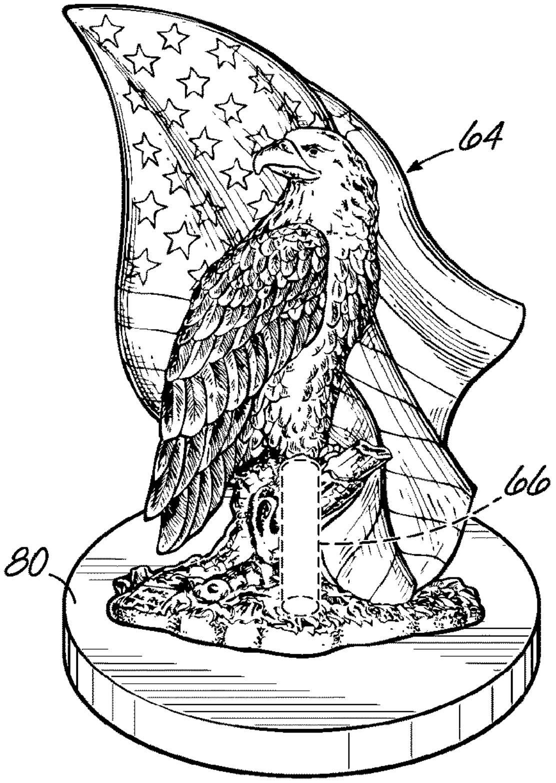

FIGS. 5A and 5B illustrate another alternative embodiment. In this embodiment, a base 80 or "puck" has the upstanding post 56 mounted to an upper surface thereof. The base or puck 80 can have an openable and closeable cover on a lower surface thereof (not shown) so that a small amount of cremation ashes can be stored therein. The ornament 64 is mounted on the base 80, with the post 56 received in the cylindrical hole 66 of the ornament 60.

Figure 6:
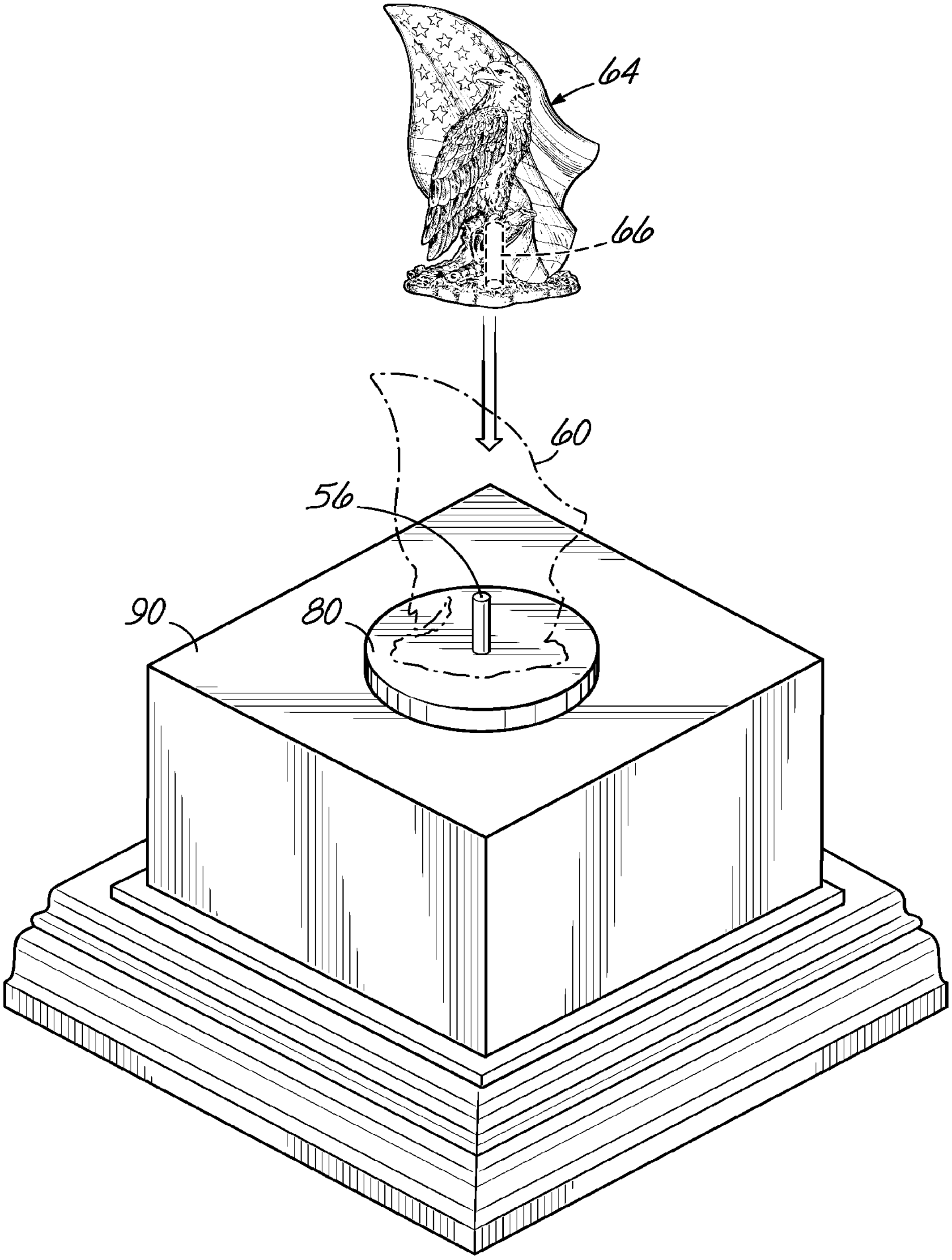
FIG. 6 is a front perspective view of another cremation urn illustrating the ornament and base of FIGS. 5A and 5B mounted thereon.

FIG. 6 illustrates yet another alternative embodiment. In this embodiment, a cremation urn 90 has the base 80 with ornament 64 mounted thereon placed atop the urn 90. Again, the ornament 64 is mounted on the base 80, with the post 56 received in the cylindrical hole 66 of the ornament 64.

Figure 7:
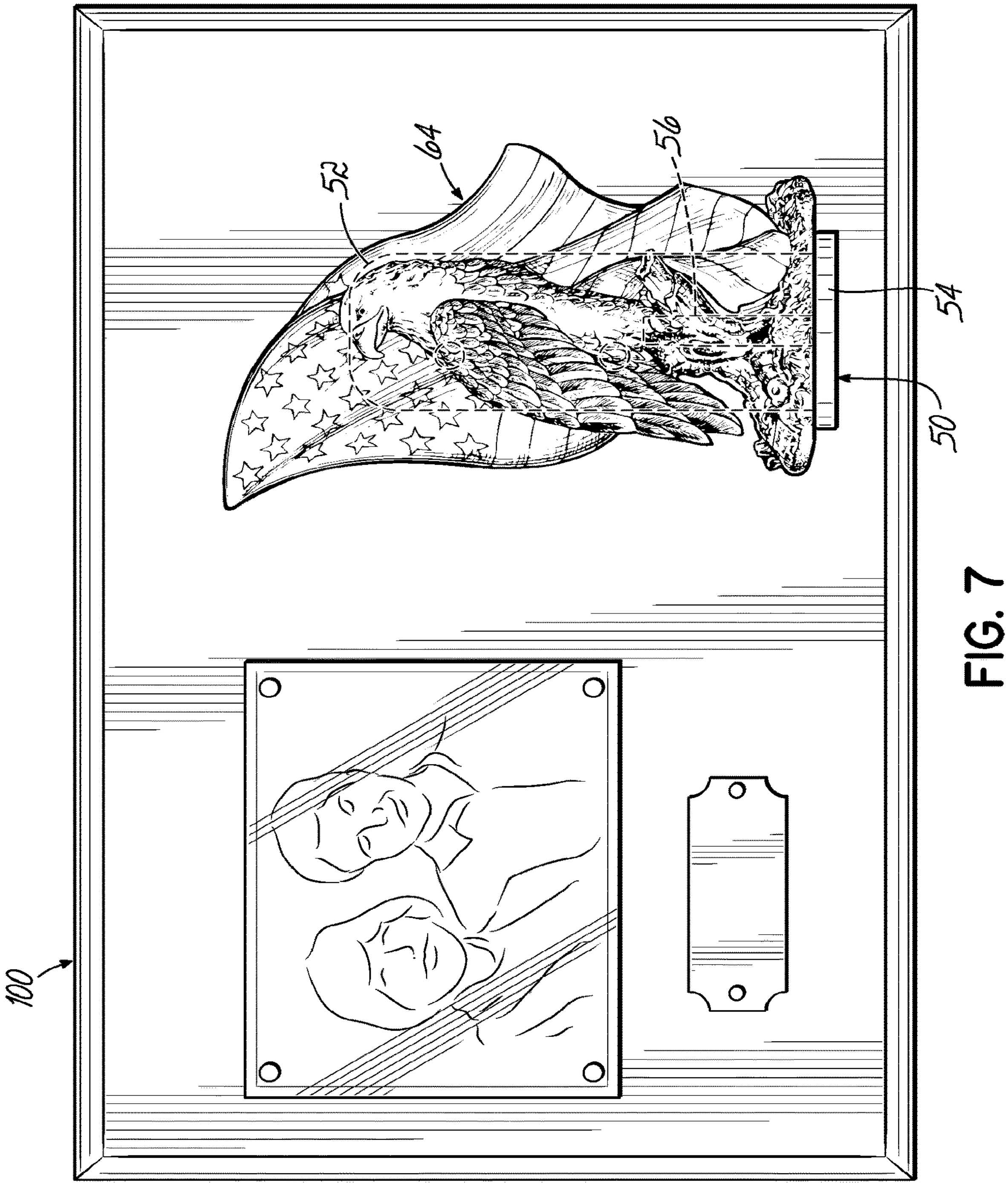
FIG. 7 is a front view of a plaque with the adapter mounted thereto and the ornament mounted to the adapter.

FIG. 7 illustrates still another alternative embodiment. In this embodiment, a memorial plaque 100 has a clip 30 mounted thereto, and the adapter 50 is secured to the clip 30. Then, the ornament 64 is mounted on the adapter 50, with the post 56 of the adapter 50 being received in the cylindrical hole 66 of the ornament 64. As with the prior casket and urn embodiments, the plaque need not even use such a clip 30, as long as a surface of the plaque (metal or wood) has the pair of right-angle keyhole-shaped grooves formed therein.

Note that the adapter 50 could have a pair of magnets mounted to a rear side thereof as by screws or the like. In this way, the adapter 50 with ornament 64 thereon can be magnetically attached to a ferrous/magnetic cap panel of the casket.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A memorial plaque comprising:

a plaque surface having a pair of keyhole-shaped grooves therein;

an L-shaped adapter having a leg and a foot, the leg having a pair of studs on a rear side thereof, each of which is received in a respective one of the keyhole-shaped grooves, the foot having an upstanding post thereon, wherein the L-shaped adapter comprises a magnet mounted to the rear side of the leg; and a decorative ornament that is three-dimensional an entire 360 degrees about a vertical axis of the decorative ornament, the decorative ornament having a hole extending upwardly from a bottom thereof into the decorative ornament, the upstanding post received in the hole as the decorative ornament is positioned on the foot of the L-shaped adapter to secure the decorative ornament to the L-shaped adapter.

2. The memorial plaque of claim 1, wherein the pair of keyhole-shaped grooves are formed in a clip that is attached to the plaque surface.

3. The memorial plaque of claim 1, wherein the decorative ornament is three-dimensional the entire 360 degrees without having a planar back.

4. The memorial plaque of claim 1, wherein the hole comprises an open end and a closed end.

5. The memorial plaque of claim 1, wherein the hole of the decorative ornament is cylindrical.

6. A memorial plaque comprising:

a plaque surface having a pair of right-angle keyhole-shaped grooves formed in the plaque surface;

an L-shaped adapter having a leg and a foot, the leg having a pair of studs on a rear side thereof, each of which is received in a respective one of the keyhole-shaped grooves, the foot having an upstanding post thereon, wherein the L-shaped adapter comprises a magnet mounted to the rear side of the leg; and a decorative ornament that is three-dimensional an entire 360 degrees about a vertical axis of the decorative ornament, the decorative ornament having a hole extending upwardly from a bottom thereof into the decorative ornament, the upstanding post received in the hole as the decorative ornament is positioned on the foot of the L-shaped adapter to secure the decorative ornament to the L-shaped adapter.

7. The memorial plaque of claim 6, wherein the decorative ornament is three-dimensional the entire 360 degrees without having a planar back.

8. The memorial plaque of claim 6, wherein the hole comprises an open end and a closed end.

9. The memorial plaque of claim 6, wherein the hole of the decorative ornament is cylindrical.

* * * * *